United States Patent
Frankenberger et al.

(10) Patent No.: US 7,598,657 B2
(45) Date of Patent: Oct. 6, 2009

(54) STRUCTURE ELEMENT FOR AN AIRCRAFT

(75) Inventors: Eckart Frankenberger, Hamburg (DE); Peter Konstanzer, Taufkirchen (DE)

(73) Assignee: Airbus Deutschland GmbH (DE)

( * ) Notice: Subject to any disclaimer, the term of this patent is extended or adjusted under 35 U.S.C. 154(b) by 143 days.

(21) Appl. No.: 11/333,676

(22) Filed: Jan. 17, 2006

(65) Prior Publication Data
US 2006/0273690 A1 Dec. 7, 2006

Related U.S. Application Data

(60) Provisional application No. 60/644,824, filed on Jan. 18, 2005.

(30) Foreign Application Priority Data

Jan. 18, 2005 (DE) .................. 10 2005 002 370

(51) Int. Cl.
*H01L 41/08* (2006.01)
(52) U.S. Cl. .................. 310/328; 310/321
(58) Field of Classification Search ........... 310/321, 310/326, 330–332, 328
See application file for complete search history.

(56) References Cited

U.S. PATENT DOCUMENTS

| | | |
|---|---|---|
| 2,361,071 A | 10/1944 | Vang |
| 4,849,668 A | 7/1989 | Crawley et al. |
| 4,958,100 A | 9/1990 | Crawley et al. |
| 5,542,230 A | 8/1996 | Schütze |
| 5,713,438 A | 2/1998 | Rossetti et al. |
| 5,765,817 A | 6/1998 | Breitbach |
| 5,894,651 A | 4/1999 | Dvorsky et al. |
| 5,973,440 A | 10/1999 | Nitzsche et al. |
| 6,123,293 A | 9/2000 | Breitbach et al. |
| 6,193,032 B1 | 2/2001 | Lesieutre et al. |
| 6,252,334 B1 | 6/2001 | Nye et al. |
| 6,480,609 B1 | 11/2002 | Strehlow et al. |
| 6,564,640 B1 | 5/2003 | Allaei |
| 2004/0070311 A1 | 4/2004 | Bebesel et al. |

FOREIGN PATENT DOCUMENTS

| | | |
|---|---|---|
| CA | 2 235 309 | 10/1999 |
| DE | 4310825 | 7/1994 |
| DE | 10139686 | 5/2002 |
| DE | 10154391 | 5/2003 |
| DE | 10226241 A | 1/2004 |
| WO | WO-02/23062 A | 3/2002 |
| WO | WO-02/42854 A | 5/2002 |

*Primary Examiner*—Mark Budd
(74) *Attorney, Agent, or Firm*—Lerner, David, Littenberg, Krumholz & Mentlik, LLP

(57) ABSTRACT

Nowadays floor structures in the fuselage of airplanes, which floor structures comprise transverse floor girders, are usually connected to the frame on the right and left by means of rivets and are in turn supported vertically downward by the frame by way of Samer rods. According to one embodiment of the present invention a structural element for an aircraft is stated, comprising an active element and a passive element. In this way additional stiffening of the fuselage, a reduction in fuselage deformation, or active vibration dampening can be provided without additional weight.

12 Claims, 1 Drawing Sheet

STRUCTURE ELEMENT FOR AN AIRCRAFT

CROSS-REFERENCE TO RELATED APPLICATIONS

This application claims the benefit of the filing date of U.S. Provisional Patent Application No. 60/644,824 filed Jan. 18, 2006, the disclosure of which is hereby incorporated herein by reference.

BACKGROUND OF THE INVENTION

The present invention relates to active structural elements of aircraft. In particular, the present invention relates to a structural element for an aircraft, comprising an active element and a passive element, an aircraft comprising a corresponding structural element, the use of a structural element in an aircraft, and a method for the active structuring of aircraft.

In the fuselage of aeroplanes, floor structures that comprise transverse floor girders and seat rails are connected to the frame on the right and left by means of rivets and are in turn supported vertically downward by the frame by way of so-called Samer rods. In this arrangement the seat rails extend transversely over the transverse girders. The floor structures are closed off with the use of floor panels. This construction is designed to achieve as rigid a floor as possible.

Despite the stiffening described above, the entire fuselage structure is to be considered an elastic formation. As a result of gust loads and flight manoeuvres a host of different types of elastic deformation are introduced into the fuselage. The longer the fuselage the more frequent the occurrence of oscillations that can lead to a so-called fishtailing effect in which the rear of the fuselage oscillates to and fro. Oscillations in the fuselage affect passenger comfort. In addition, in very large floor structures there is the danger of the floor acting as an elastic structure.

In particular in the case of a large length/diameter ratio, further stiffening of fuselages quickly involves weight problems, i.e. further stiffening using more material clearly results in significant additional weight while providing relatively modest improvements in rigidity.

DE 102 26 241 A1 describes a method for suppressing elastic aircraft-fuselage movements. In this arrangement a sensor measuring system is used to register fuselage movements, and the elastic fuselage movements are subsequently suppressed by a mass system arranged in the aircraft.

SUMMARY OF THE INVENTION

According to an exemplary embodiment of the present invention a structural element for aircraft is provided, which structural element comprises an active element and a passive element, wherein the active element is adapted for controllable or regulable active introduction of forces into the passive element, and wherein the structural element is adapted to stiffen a fuselage, to reduce deformation of the fuselage, or to dampen vibrations in the fuselage.

By designing the active element for the controllable or regulable active introduction of forces into the passive element, counterforces can be applied in a targeted way to the passive element, which counterforces for example counteract any bending of the fuselage, which bending is supported, reinforced or stabilised by the structural element. In this way the behaviour of fuselage structures may be actively influenced in order to counteract any deformation introduced by external loads. According to the invention such active control may take place without the mentioned weight disadvantages of conventional structural stiffening involving mass, which structural stiffening would principally entail an increased use of materials. By providing high-performance fast regulating electronics, vibrations in the fuselage may be dampened, which in particular results in significant noise suppression in the cabin.

According to a further exemplary embodiment of the present invention furthermore the active element is designed for actively stiffening the structural element, wherein the active element is essentially integrated in the passive element.

Therefore, by the active introduction, in a targeted way, of forces into the passive element, structural elements may be stabilised or stiffened. In this way passenger comfort may be improved.

According to a further exemplary embodiment of the present invention the active element comprises piezoceramics, wherein the piezoceramics are deformable by applying a voltage signal to the piezoceramics.

Based on the inverse piezoelectric effect, it may thus be possible by electrical selection to change the mechanical properties of the piezoceramics. Based on the integration of the ceramics in the passive element, deformation of the structural element may actively be influenced.

According to a further exemplary embodiment of the present invention electrical contacts are provided for measuring a voltage generated by the piezoceramics or for measuring a capacitance of the piezoceramics, wherein the generated voltage corresponds to a force acting on the piezoceramics, and wherein the capacitance corresponds to a temperature of the piezoceramics.

Consequently, by way of the electrical contacts the voltage or capacitance of the piezoceramics can be measured. Measurement takes place for example by way of measuring electronics. According to one embodiment of the present invention the measured data record is subsequently evaluated within evaluation electronics and used to generate a control signal or regulating signal for the active element by control or regulating electronics.

Thus, by way of registering the internal forces and the flight manoeuvres and gust loads that trigger said internal forces (by way of the aircraft control system or by way of small piezoacceleration sensors) for each point in time, the effect on the fuselage may be registered.

According to a further exemplary embodiment of the present invention the passive element is selected from the group comprising floor structure, frame, transverse girder and Samer rod.

It may thus be possible to use active and so-called "smart" materials, e.g. based on piezoceramics, on coupling positions between the floor structure and the frame, in particular the frame at the coupling positions of transverse girders and transverse girder Samer rods, for active vibration reduction or dampening or for reducing deformation of the fuselage.

According to a further exemplary embodiment of the present invention a method for active structuring of aircraft is provided. In this arrangement a control signal or regulating signal for an active element of a structural element is generated by control- or regulating electronics, and subsequently the active element is driven with the control- or regulating signal. In this arrangement the structural element comprises the active element and a passive element, wherein the active element is designed for controllable regulable active introduction of forces into the passive element, and wherein the structural element is designed for reducing deformation in a fuselage or for dampening vibrations in the fuselage.

According to this exemplary embodiment of the present invention a simple and quick method may be provided by which active oscillation dampening or active reduction in the deformation of the fuselage or active stiffening of the structural element is provided. In this arrangement, control according to the invention takes place without the weight disadvantages associated with conventional structural stiffening involving mass. With the method according to the invention the comfort in the cabin, which comfort is affected by oscillations of all types, can be improved in a way that to a large extent is weight-neutral.

Further objects, embodiments and advantages of the invention are stated in the subordinate claims and the secondary independent claims.

Below, the invention is described in more detail with reference to exemplary embodiments with reference to the drawings.

DETAILED DESCRIPTION

Figure 1:
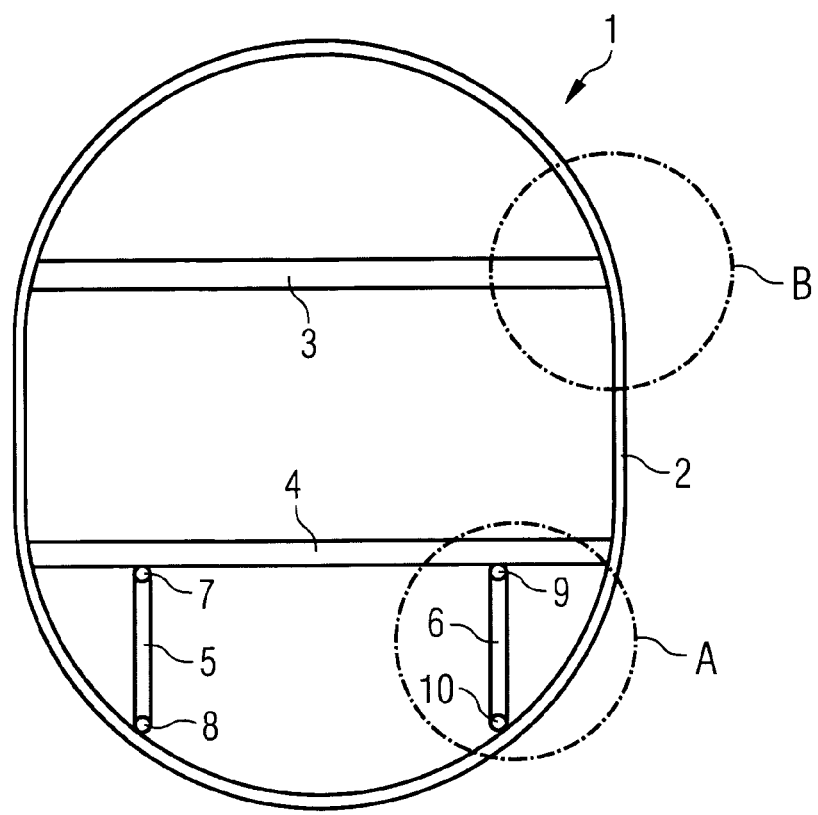
FIG. 1 shows a diagrammatic cross-sectional representation of a fuselage.

In the following description of the figures, the same reference characters are used for identical or similar elements.

FIG. 1 shows a diagrammatic cross-sectional representation of a fuselage. As is shown in FIG. 1 the fuselage 1 comprises an external skin 2 that is stabilised, supported and reinforced by transverse girders 3, 4 and Samer rods 5, 6. On the right-hand and left-hand sides the transverse girders 3, 4, which bear the floor structures in the fuselage, are connected to the aircraft frame (not shown in FIG. 1) by way of rivets. The Samer rods 5, 6 are used to support the transverse floor girder 4 downward on the frame. This construction is designed to achieve as stiff a floor as possible.

As a result of wind gusts or as a result of the engines, at times considerable forces are introduced into the aircraft structure, which forces can for example cause undesirable resonance oscillations or vibrations. These vibrations can at times cause significant noise loads (for example caused by resonance oscillations of the panels) and result in reduced comfort (for example caused by oscillations in the seats) within the aircraft cabin. According to the invention the elastic deformation of the fuselage is reduced due to the above-mentioned loads without any increase in the structural mass.

With the use of structural elements according to the invention, which structural elements include active and passive elements, stiffening of the floor or of the entire fuselage can be increased in relation to bending and torsion.

For example, as diagrammatically shown in FIG. 1, active elements 7, 8, 9, 10 are placed between the Samer rods 5, 6 and the transverse girder 4 or between the Samer rods 5, 6 and the external skin 2 (or a fuselage rib). The Samer rod 5 and the active elements 7, 8 thus form a structural element according to the invention, which structural element is used to stiffen the fuselage, to reduce fuselage deformation and to actively dampen vibrations in the fuselage. Likewise, the Samer rod 6 and the active elements 9, 10 form such a second structural element for this very purpose.

Figure 2:
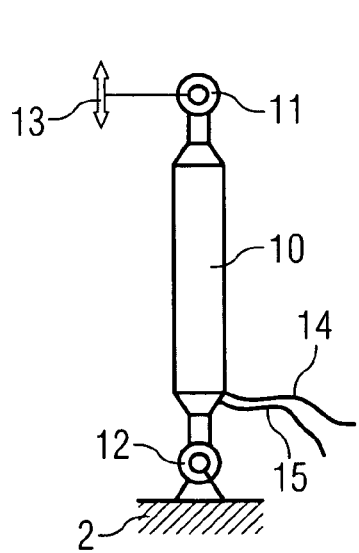
FIG. 2 shows a diagrammatic representation of an active element according to one embodiment of the present invention.

FIG. 2 shows a diagrammatic representation of an active element according to one embodiment of the present invention. It shows partial section A of FIG. 1.

The active element 10 comprises an upper connection element 11 and a lower connection element 12. Furthermore, it comprises lines 14, 15 which are used for the supply of electrical, hydraulic or pneumatic energy.

The bottom connection element 12 is connected to the external skin 2 or a frame, while the top connection element 11 is for example connected to the Samer rod 6 shown in FIG. 1. By introducing corresponding control- or regulating signals into the active element 10 by way of the lines 14, 15 or by the corresponding letting-in or letting-out of hydraulic fluid or compressed air, the active element 10 expands or contracts. In this way the active element 10 introduces forces by way of the top connection element 11 into the Samer rod 6 (see FIG. 1), which can result in vibration dampening. In this way external forces can be compensated for. The movement of the active element 10 is indicated by the arrow 13.

Figure 3:
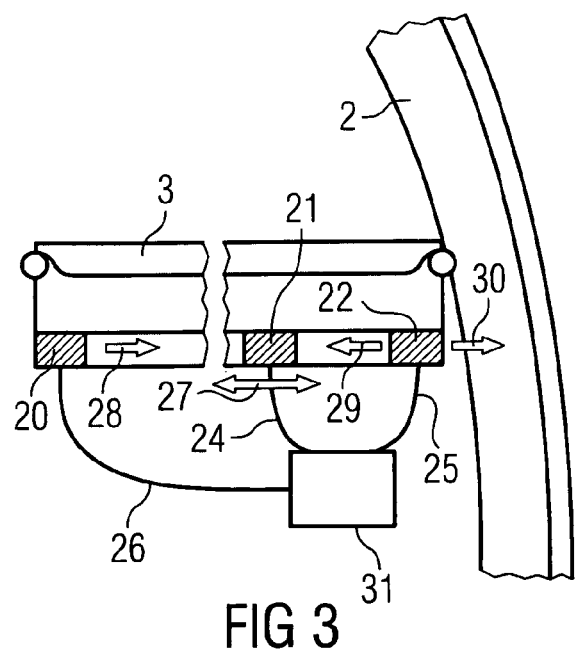
FIG. 3 shows a diagrammatic cross-sectional representation of a structural element according to one embodiment of the present invention, which structural element is incorporated in a fuselage.

FIG. 3 shows a diagrammatic cross-sectional representation of a structural element according to one embodiment of the present invention, which structural element is incorporated in the fuselage. It shows partial section B of FIG. 1.

The structural element according to the invention comprises a passive element 3, which is for example a transverse girder that bears a floor structure (see FIG. 1), and active elements 20, 21 and 22.

In this arrangement the active elements 20, 21, 22 are designed in the form of piezoceramics, which are deformable by applying a voltage signal by way of supply lines 24, 25, 26. In this arrangement deformation is in particular by way of compression or elongation of the crystals 20, 21, 22 in the direction of the arrows 27, 28, 29, 30. All active elements 20, 21, 22 can be driven by way of the control- and regulating electronics 31.

In particular, by placing a bending-moment pair 21, 22 in the floor beam or transverse girder 3 stiffening of the floor can be achieved. In this way it is also possible to reduce deformation of the floor or of the entire fuselage, or to dampen vibrations.

Furthermore, the control- or regulating electronics 31 can comprise measuring electronics and evaluation electronics. The measuring electronics can be used for measuring physical variables, such as for example a voltage generated by one of the piezoelements 20, 21, 22 (which voltage is for example generated on the basis of pressure exerted on the element 20) or a capacitance of one of the piezoelectric elements 20, 21, 22. The voltage measurement provides information about the force that acts on the corresponding piezoelectric element, and the capacitance measurement of a piezoelectric element 20, 21, 22 for example provides information about the temperature of the corresponding element.

Since the temperature of the piezoelectric element influences its reciprocal value of modulus of elasticity (in this context the term "reciprocal value of modulus of elasticity" refers to the ratio between the voltage applied to a piezoelement and the resulting compression or elongation of the piezoelement), knowledge of the current temperature of the piezoelement can advantageously be used to calibrate the control- or regulating signals for driving the active elements 20, 21, 22. For example in the case of a drop in temperature the amplitudes of the control signals can be correspondingly increased so that even control is ensured.

In contrast to the above, measuring the voltage generated by the piezoceramics, which voltage is based on the direct piezoelectric effect, can be used to provide information about internal forces in the structural element. The corresponding measured values can then be registered and evaluated in the evaluation electronics in conjunction with the knowledge of the flight manoeuvres and gust loads that trigger such measured values, which flight manoeuvres are for example provided by way of the flight control system or by way of small piezoacceleration sensors or other sensors. Thus for each point in time the effect of gusts and flight manoeuvres, or the counteraction that the active elements have on the fuselage, can be registered and evaluated.

Since in the case of piezoceramics, based on the inverse piezoelectric effect, the mechanical characteristics of the ceramics can be changed by electrical control, by way of integrating these ceramics into the passive elements of the structural elements, deformation, for example of the floor structure, can be actively influenced. By deformation caused by external forces it is thus possible to compensate for corresponding counterforces. Furthermore, forces can be introduced into the structure in a targeted way and in this way the structure can be actively dampened or actively stiffened.

In particular, piezoceramics, which are used for the active dampening or stiffening according to the invention and for sensing, provide an advantage in that they can be used reliably and without malfunctions even at extremely low temperatures (right down to the millikelvin region), at low air pressure (right down to the ultra-high vacuum region) and with strong magnetic fields. Consequently the structural element according to the invention cannot only be used in aviation, but for example also in space applications, where the environmental conditions are extreme.

Due to the great sensitivity of the piezolectric active elements, even minimal mechanical changes or deformation or stress in the structure can be detected, as can changes in temperature.

Furthermore, an analysis of the set of measuring data (structural forces and flight manoeuvres) can take place in a neuronal network within the analysis electronics, as a result of which various load states are better predictable so that if need be corresponding counteraction can be taken well in time. Furthermore, with the data, for example by way of a finite element method, the fuselage structure can be optimised in respect of various load situations.

Implementation of the invention is not limited to the preferred embodiments shown in the figures. Instead, a multitude of variants are imaginable which use the solution shown and the principle according to the invention even in the case of fundamentally different embodiments.

In addition it should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference characters in the claims are not to be interpreted as limitations.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A structural element for an aircraft, the structural element comprising:
   an active element; and
   a passive element;
   wherein the active element is adapted for controllable or regulable active introduction of forces into the passive element; wherein the passive element is selected from the group consisting of a floor structure, frame in the floor region of the aircraft, traversal beam in the floor region, and Samer rod; and
   wherein the structural element is adapted to reduce bending of a fuselage in a floor region of the aircraft which is due to a flight maneuver or a gust load;
   wherein the structural element is connected to a control- or regulating electronics adapted for registering internal forces, flight maneuvers and a gust load that trigger said internal forces and for predicting a load state of the fuselage such that corresponding counter forces can be introduction into the passive element well in time in order to reduce bending of the fuselage.

2. The structural element of claim 1,
   wherein furthermore the active element is adapted for actively stiffening the structural element; and
   wherein the active element is essentially integrated in the passive element.

3. The structural element of claim 1,
   wherein the active element comprises piezoceramics; and
   wherein the piezoceramics are deformable by applying a voltage signal to the piezoceramics.

4. The structural element of claim 3,
   wherein electrical contacts are provided for measuring a voltage generated by the piezoceramics or for measuring a capacitance of the piezoceramics;
   wherein the generated voltage corresponds to a force acting on the piezoceramics; and
   wherein the capacitance corresponds to a temperature of the piezoceramics.

5. The structural element of claim 1,
   wherein the passive element is selected from the group consisting of floor structure, frame, transverse girder and Samer rod.

6. An aircraft comprising a fuselage, a structural element to reduce deformation of the fuselage and control- or regulating electronics, the structural element comprising:
   an active element; and
   a passive element;
   wherein the passive element is selected from the group consisting of a floor structure, frame in the floor region of the aircraft, traversal beam in the floor region, and Samer rod;
   wherein the active element is adapted for controllable or regulable active introduction of forces into the passive element to reduce bending of the fuselage in a floor region of the aircraft which is due to a flight maneuver or a gust load;
   the control- or regulating electronics being adapted for registering internal forces, flight maneuvers and a gust load that trigger said internal forces and for predicting a load state of the fuselage such that corresponding counter forces can be introduction into the passive element well in time in order to reduce bending of the fuselage.

7. The aircraft of claim 6, further comprising:
   measuring electronics for measuring a voltage generated by the active element or a capacitance of the active element;
   evaluation electronics to evaluate the data measured by the measuring electronics; and
   control- or regulating electronics to generate a control- or regulating signal for the active element.

8. The use of a structural element of claim 1 in an aircraft.

9. A method for the active structuring of aircraft, comprising the following steps:
- registering internal forces, flight maneuvers and a gust load that trigger said internal forces and predicting a load state of the fuselage by control- or regulating electronics;
- generating a control- or regulating signal for an active element of a structural element based on the predicted load state by means of the control- or regulating electronics;
- driving the active element with the control- or regulating signal, thereby reducing deformation in a fuselage;
- wherein the structural element comprises:
  - the active element; and
  - a passive element;
    - wherein the passive element is selected from the group consisting of a floor structure, frame in the floor region of the aircraft, traversal beam in the floor region, and Samer rod;
    - wherein the active element is designed for controllable or regulable active introduction of forces into the passive element; and
    - wherein the structural element is designed for reducing bending in the fuselage in a floor region of the aircraft which is due to a flight maneuver or a gust load.

10. The method of claim 9, further comprising the following steps:
- measuring forces experienced in a structural element by means of measuring electronics;
- evaluating the data measured by the measuring electronics by way of evaluation electronics; and
- generating a control- or regulating signal for the active element by the control- or regulating electronics on the basis of the evaluation.

11. The structural element of claim 1, wherein the structural element is further adapted to stiffen the fuselage and to dampen vibrations in the fuselage.

12. The method of claim 9, further comprising:
dampening vibrations in the fuselage; and
stiffening the fuselage.

* * * * *

UNITED STATES PATENT AND TRADEMARK OFFICE
CERTIFICATE OF CORRECTION

PATENT NO. : 7,598,657 B2  Page 1 of 1
APPLICATION NO. : 11/333676
DATED : October 6, 2009
INVENTOR(S) : Eckart Frankenberger and Peter Konstanzer It is certified that error appears in the above-identified patent and that said Letters Patent is hereby corrected as shown below:

Col. 1, Line 19, "aeroplanes" should read --airplanes--.
Col. 6, Line 10, delete "a" after --connected to--.
Col. 6, Line 15, "introduction" should read --introduced--.
Col. 6, Line 56, "introduction" should read --introduced--.

Signed and Sealed this

Sixteenth Day of November, 2010

David J. Kappos
*Director of the United States Patent and Trademark Office*